(12) United States Patent
Karpuška

(10) Patent No.: US 11,831,599 B1
(45) Date of Patent: *Nov. 28, 2023

(54) APERIODIC UPDATING OF PARAMETERS IN A MESH NETWORK

(71) Applicant: UAB 360 IT, Vilnius (LT)

(72) Inventor: Rytis Karpuška, Vilniaus r. (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,346

(22) Filed: May 22, 2022

Related U.S. Application Data

(63) Continuation of application No. 17/748,003, filed on May 18, 2022, now Pat. No. 11,647,413.

(51) Int. Cl.
  *H04L 61/5007* (2022.01)
  *H04L 61/2517* (2022.01)
  *H04L 61/5053* (2022.01)

(52) U.S. Cl.
  CPC ...... *H04L 61/2517* (2013.01); *H04L 61/5007* (2022.05); *H04L 61/5053* (2022.05)

(58) Field of Classification Search
  None
  See application file for complete search history.

(56) References Cited

U.S. PATENT DOCUMENTS

| | | | |
|---|---|---|---|
| 7,515,549 | B2 | 4/2009 | Wing et al. |
| 2007/0165629 | A1 | 7/2007 | Chaturvedi et al. |
| 2017/0289225 | A1* | 10/2017 | Snyder ............... H04L 65/752 |
| 2020/0112517 | A1 | 4/2020 | Mena et al. |
| 2021/0266346 | A1 | 8/2021 | Gordon et al. |
| 2022/0052850 | A1* | 2/2022 | Fagan ................ H04L 9/14 |

* cited by examiner

*Primary Examiner* — Mohammad S Adhami
(74) *Attorney, Agent, or Firm* — The Pattani Law Group

(57) ABSTRACT

A method including receiving, by an infrastructure device from a first device in communication with a second device in a mesh network, periodic requests requesting the infrastructure device to determine a current communication parameter associated with the first device; receiving, by the infrastructure device from first device during an interval between transmissions of the periodic requests, an aperiodic request requesting the infrastructure device to determine the current communication parameter based at least in part on the first device determining occurrence of a triggering event during the interval; and transmitting, by the infrastructure device to the first device during the interval, communication information based at least in part on receiving the aperiodic request, the communication information indicating the current communication parameter. Various other aspects are contemplated.

20 Claims, 7 Drawing Sheets

APERIODIC UPDATING OF PARAMETERS IN A MESH NETWORK

CROSS REFERENCE

This application is a continuation of U.S. Non-Provisional patent application Ser. No. 17/748,003, filed on May 18, 2022, and titled "Aperiodic Updating Of Parameters In A Mesh Network," the entire contents of which are incorporated herein by reference.

FIELD OF DISCLOSURE

Aspects of the present disclosure generally relate to communications in networks, and more particularly to aperiodic updating of parameters in a mesh network.

BACKGROUND

Users may rely on mesh networks (also referred to as "meshnets") to communicate (e.g., transmit and/or receive) data among a plurality of endpoints (e.g., user devices) via one or more Internet nodes (e.g., bridges, switches, infrastructure devices, etc.). In an example, a mesh network may include a plurality of endpoints communicatively coupled to each other directly or via the one or more Internet nodes. A mesh network in which all endpoints are communicatively coupled to each other may be referred to as a fully connected network. Data transmitted by a first endpoint, from among the plurality of endpoints, may be routed over the Internet via the one or more Internet nodes to a second endpoint from among the plurality of endpoints. Also, data transmitted by the first endpoint may be routed to two or more endpoints from among the plurality of endpoints.

In a mesh network, the plurality of endpoints may cooperate with each other to enable communication of the data among the plurality of endpoints. In an example, one or more of the endpoints may participate in communication of the data. In this way, the mesh network may avoid relying on a given endpoint for communication of the data. Some mesh networks may have the ability to dynamically self-organize and self-configure the plurality of endpoints. This ability may allow such mesh networks to enable dynamic distribution of workloads, particularly in the event that one or more endpoints should fail. Further, installation overhead may be reduced.

SUMMARY

In one aspect, the present disclosure contemplates a method including transmitting, by a first device in communication with a second device in a mesh network, periodic requests to an infrastructure device associated with the mesh network, the periodic requests requesting the infrastructure device to determine a current communication parameter associated with the first device; monitoring, by the first device during an interval between transmission of the periodic requests, occurrence of a triggering event; and transmitting, by the first device based at least in part on determining occurrence of the triggering event during the interval, an aperiodic request the infrastructure device to determine the current communication parameter associated with the first device.

In another aspect, the present disclosure contemplates a first device including a memory and a processor configured to: transmit, while in communication with a second device in a mesh network, periodic requests to an infrastructure device associated with the mesh network, the periodic requests requesting the infrastructure device to determine a current communication parameter associated with the first device; monitor, during an interval between transmissions of the periodic requests, occurrence of a triggering event; and transmit, based at least in part on determining occurrence of the triggering event during the interval, an aperiodic request the infrastructure device to determine the current communication parameter associated with the first device.

In another aspect, the present disclosure contemplates a non-transitory computer readable medium storing instructions, which when executed by a processor associated with a first device, cause the processor to: transmit, while in communication with a second device in a mesh network, periodic requests to an infrastructure device associated with the mesh network, the periodic requests requesting the infrastructure device to determine a current communication parameter associated with the first device; monitor, during an interval between transmissions of the periodic requests, occurrence of a triggering event; and transmit, based at least in part on determining occurrence of the triggering event during the interval, an aperiodic request the infrastructure device to determine the current communication parameter associated with the first device.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
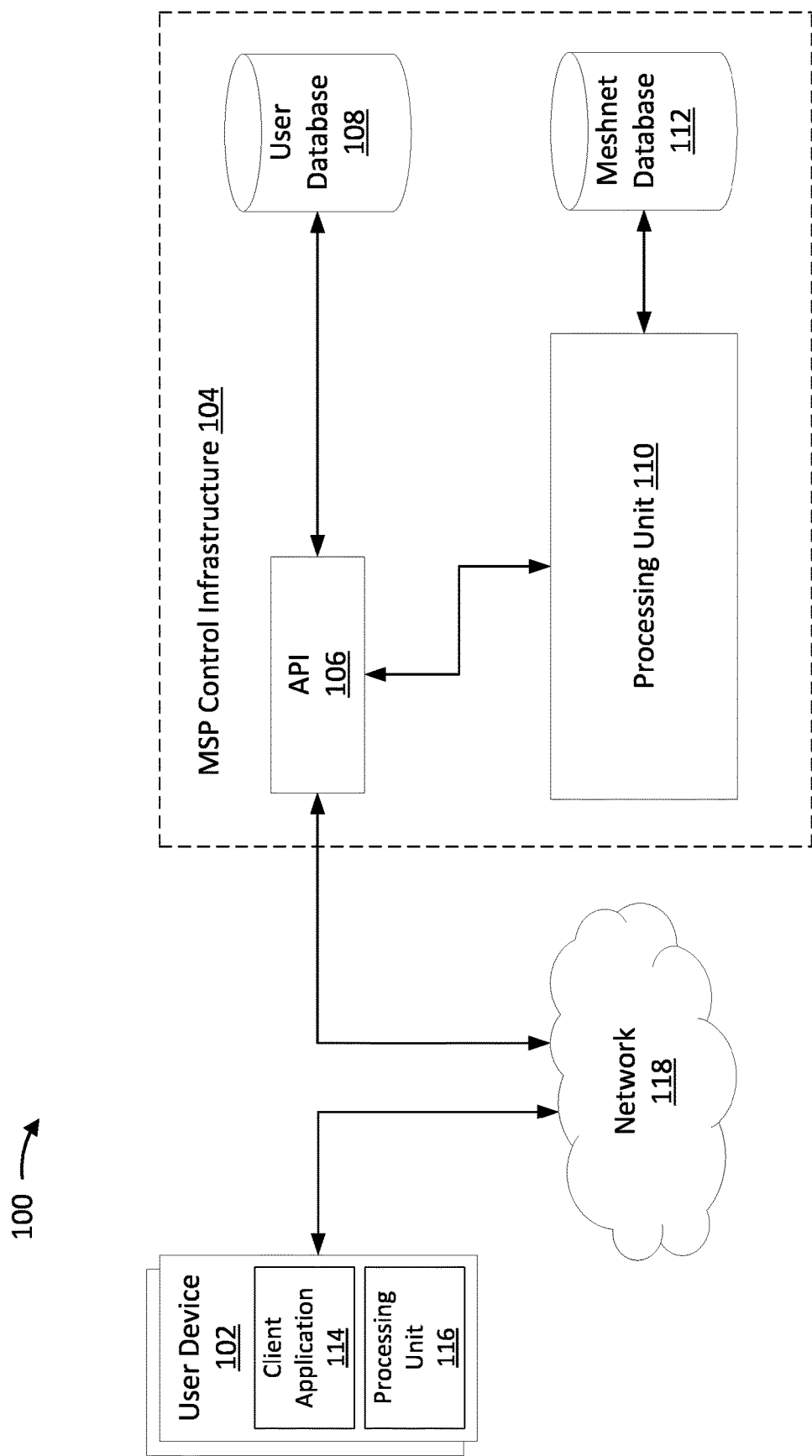

FIG. 1 is an illustration of an example system associated with aperiodic updating of parameters in a mesh network, according to various aspects of the present disclosure.

Figure 2:
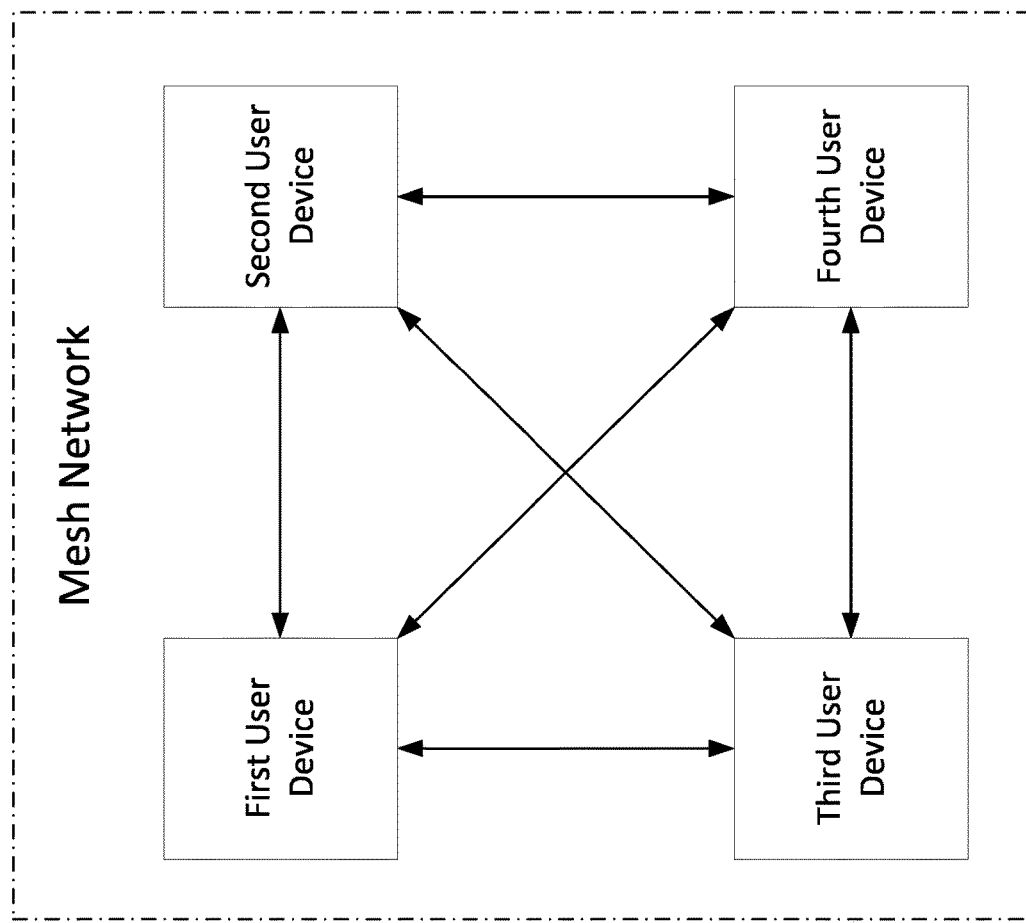

FIG. 2 is an illustration of an example associated with aperiodic updating of parameters in a mesh network, according to various aspects of the present disclosure.

Figure 3:
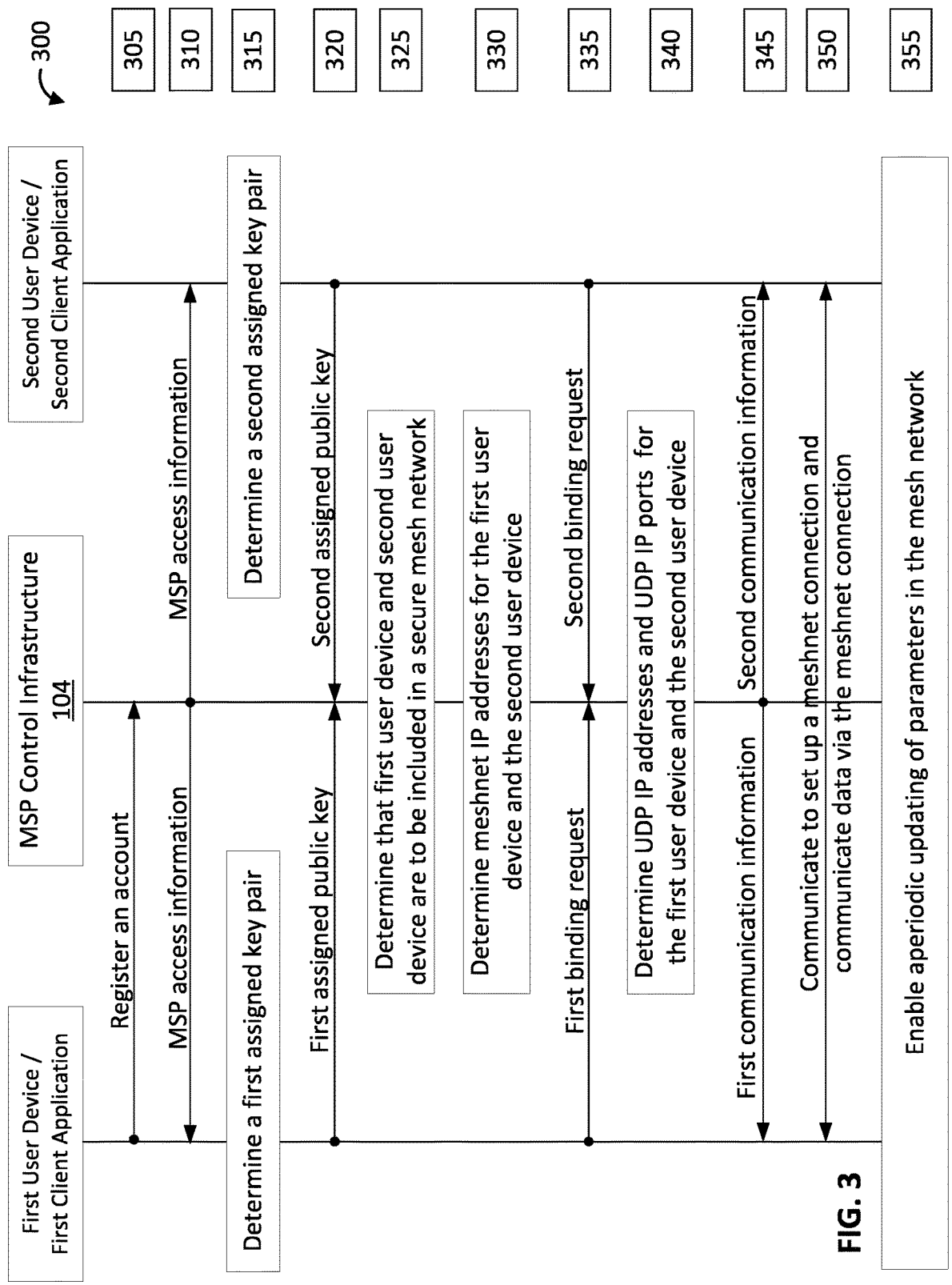

FIG. 3 is an illustration of an example flow associated with aperiodic updating of parameters in a mesh network, according to various aspects of the present disclosure.

Figure 4:
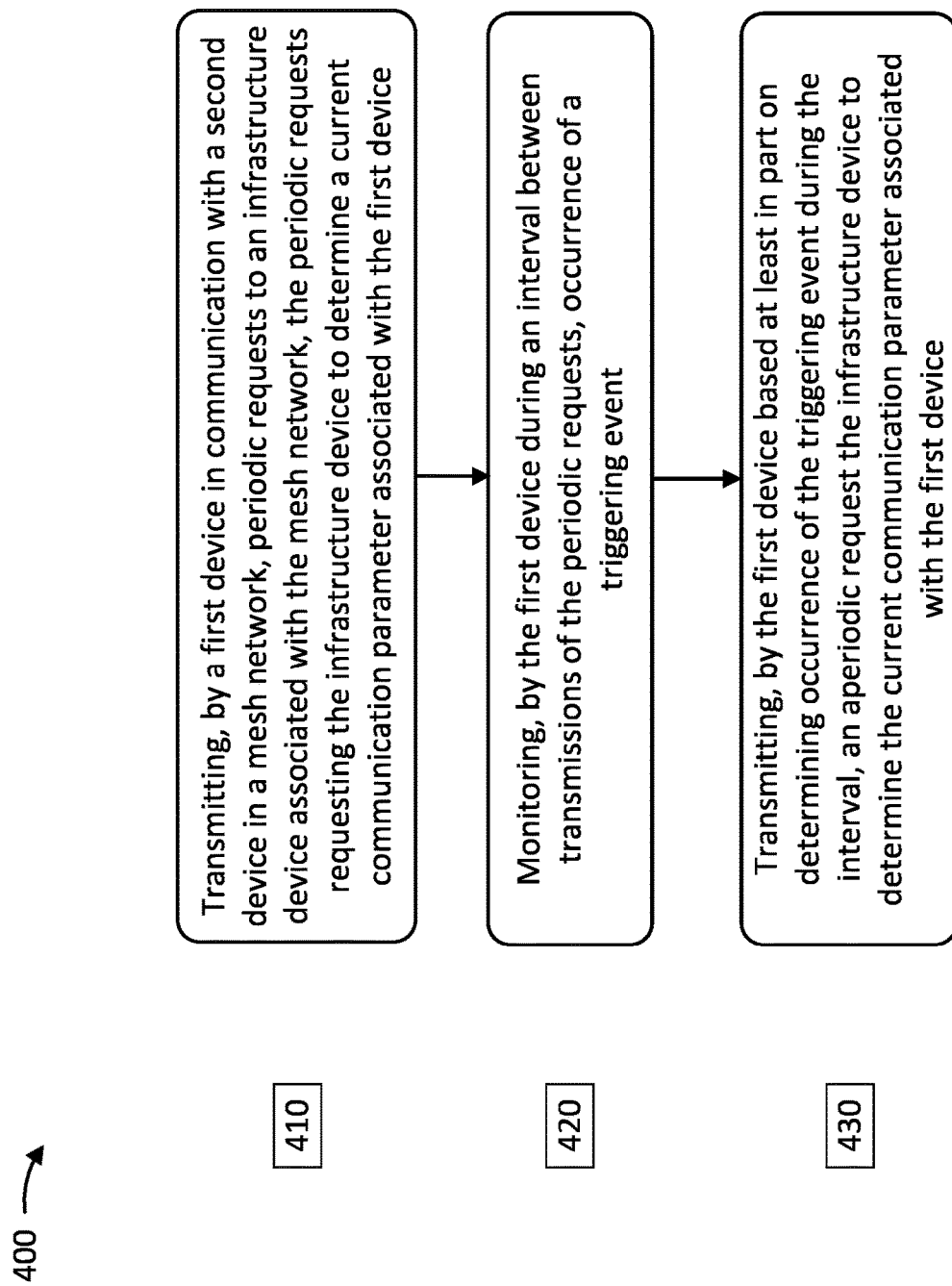

FIG. 4 is an illustration of an example process associated with aperiodic updating of parameters in a mesh network, according to various aspects of the present disclosure.

Figure 5:
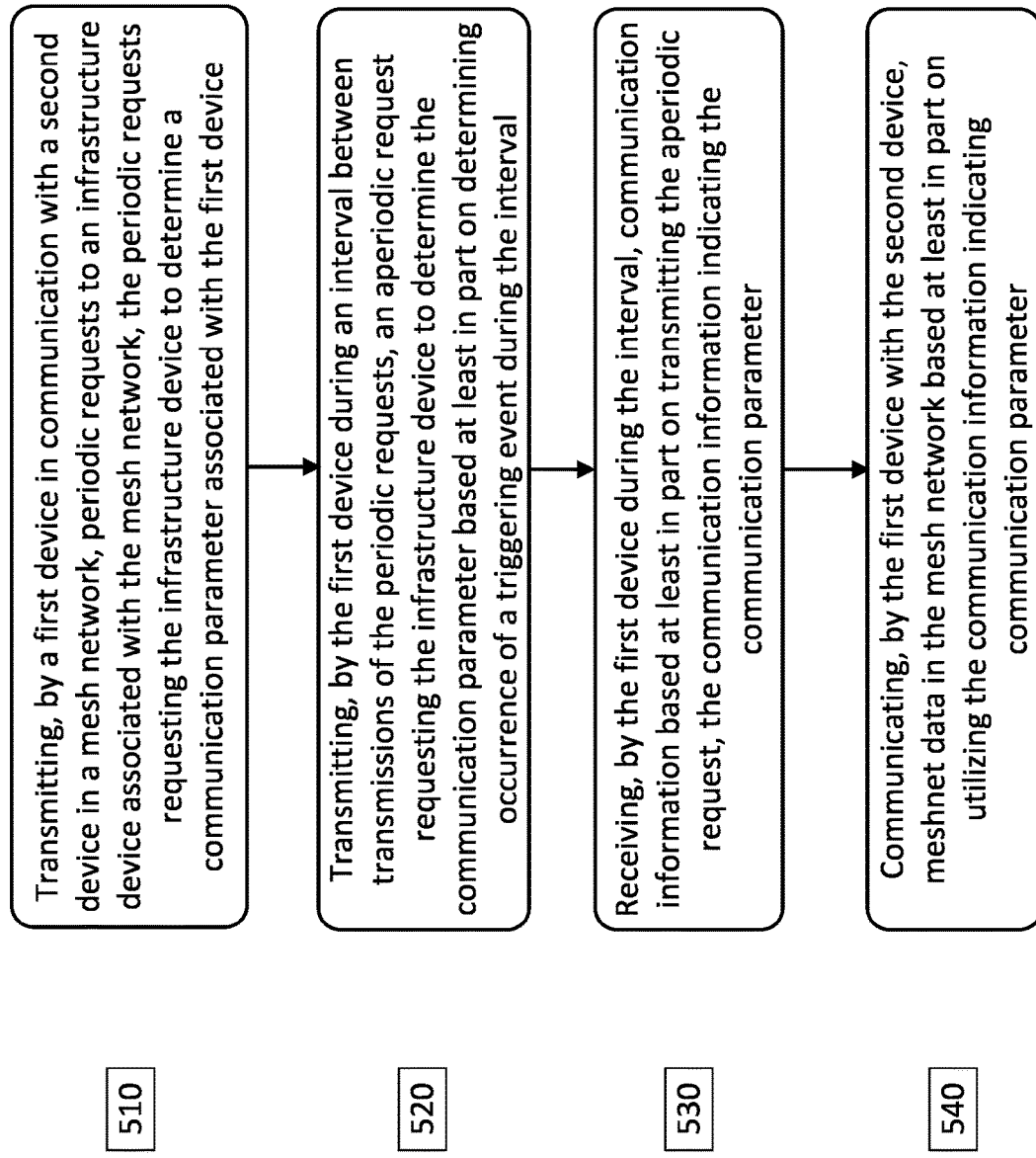

FIG. 5 is an illustration of an example process associated with aperiodic updating of parameters in a mesh network, according to various aspects of the present disclosure.

Figure 6:
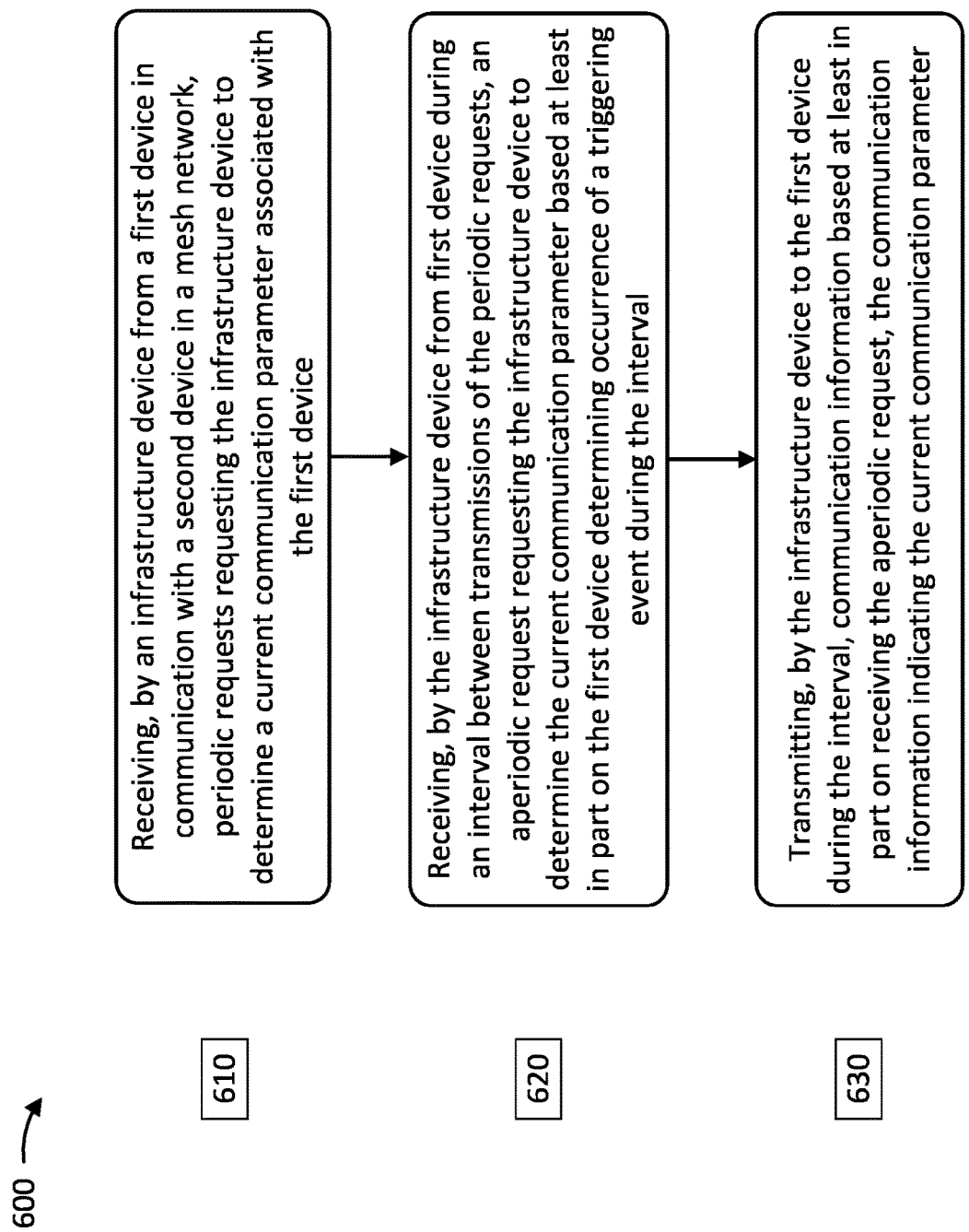

FIG. 6 is an illustration of an example process associated with aperiodic updating of parameters in a mesh network, according to various aspects of the present disclosure.

Figure 7:
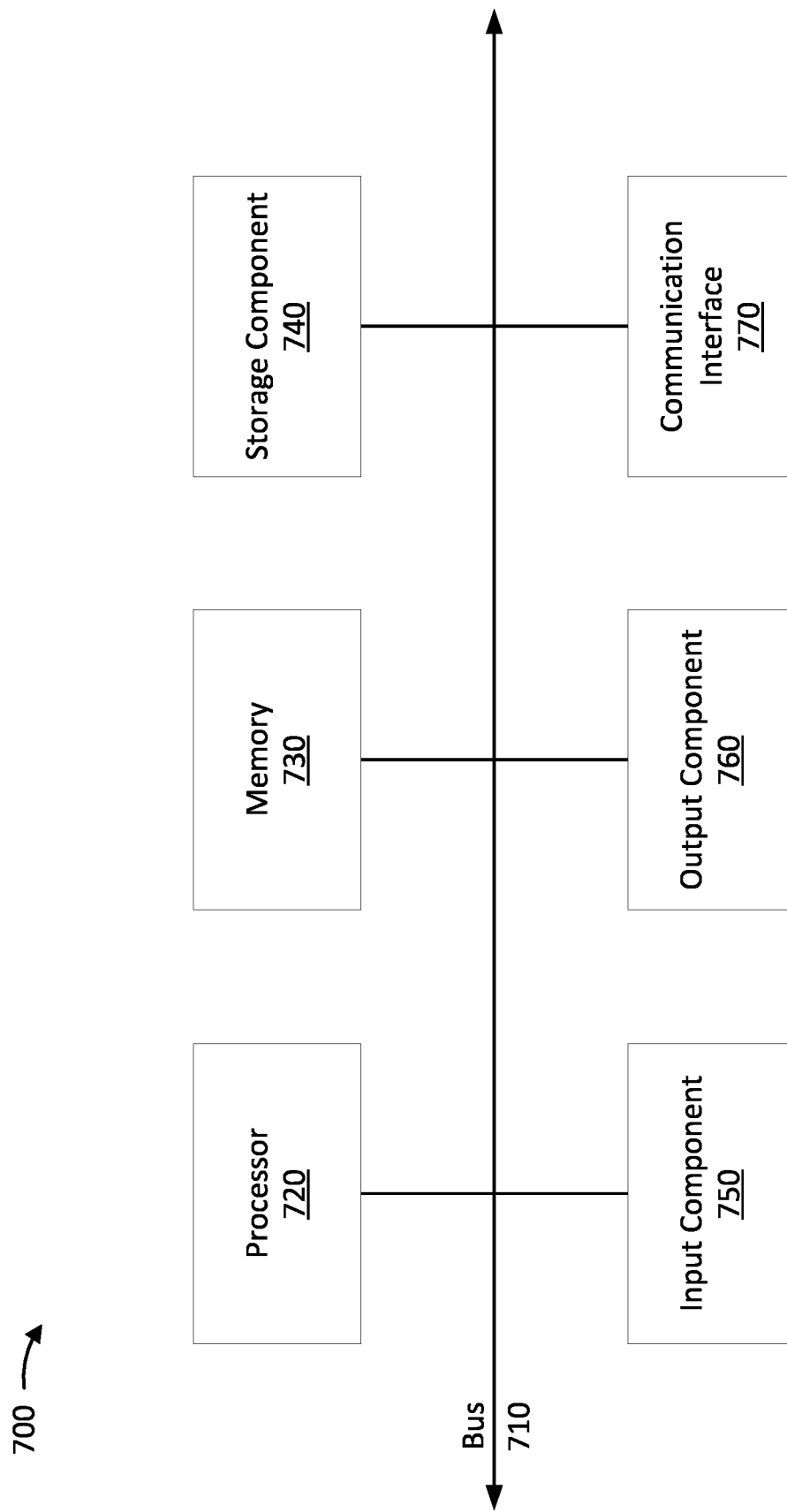

FIG. 7 is an illustration of example devices associated with aperiodic updating of parameters in a mesh network, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances, the same reference numbers are used throughout the drawings to refer to the same or like parts.

FIG. 1 is an illustration of an example 100 associated with aperiodic updating of parameters in a mesh network, according to various aspects of the present disclosure. Example 100 shows an architectural depiction of included components. In some aspects, the components may include one or more user devices 102 capable of communicating with a mesh network service provider (MSP) control infrastructure 104 for purposes of obtaining mesh network services. In some aspects, the one or more user devices 102 may communicate with the MSP control infrastructure 104 over a network 118. The MSP control infrastructure 104 may be controlled by a mesh network service provider and may include an application programming interface (API) 106, a user database 108, processing unit 110, and a meshnet database 112. In some aspects, a user device 102 may utilize a processing unit 116 and/or a client application 114, which is provided by the MSP control infrastructure 104, to communicate with the API 106. The API 106 may be capable of communicating with the user database 108 and with the processing unit 110. Additionally, the processing unit 110 may be capable of communicating with the meshnet database 112, which may be capable of storing data associated with providing mesh network services.

The user device 102 may be a physical computing device capable of hosting the client application 114 and of connecting to the network 118. The user device 102 may be, for example, a laptop, a mobile phone, a tablet computer, a desktop computer, a smart device, a router, or the like. In some aspects, the user device 102 may include, for example, mesh network enabled Internet-of-Things (IoT) devices such as smart home appliances, smart home security systems, autonomous vehicles, smart health monitors, smart factory equipment, wireless inventory trackers, biometric cyber security scanners, or the like. The network 118 may be any digital telecommunication network that permits several nodes to share and access resources. In some aspects, the network 118 may include one or more networks such as, for example, a local-area network (LAN), a wide-area network (WAN), a campus-area network (CAN), a metropolitan-area network (MAN), a home-area network (HAN), Internet, Intranet, Extranet, and Internetwork.

The MSP control infrastructure 104 may include a combination of hardware and software components that enable provision of mesh network services to the user device 102. The MSP control infrastructure 104 may interface with (the client application on) the user device 102 via the API 106, which may include one or more endpoints to a defined request-response message system. In some aspects, the API 106 may be configured to receive, via the network 118, a connection request from the user device 102 to establish a connection with the MSP control infrastructure 104 for purposes of obtaining the mesh network services. The connection request may include an authentication request to authenticate the user device 102. The API 106 may receive the authentication request and a request for the mesh network services in a single connection request. In some aspects, the API 106 may receive the authentication request and the request for the mesh network services in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The mesh network service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the mesh network service provider may provide mesh network services to the user device 102. When the received credentials fail to match at least one of the valid credentials, the user database 108 and the processor may fail to authenticate the user device 102. In this case, the mesh network service provider may decline to provide mesh network services to the user device 102.

When the user device 102 is authenticated, the user device 102 may initiate a connection and may transmit to the API 106 a request for the mesh network services. The processing unit 110 included in the MSP control infrastructure 104 may be configured to determine a mesh network associated with the user device 102 and/or to identify one or more user devices to be included within the determined mesh network. The processing unit 110 may utilize the API 106 to transmit information associated with the mesh network and/or the identified one or more user devices to the user device 102. The user device 102 may transmit an initiation request to establish secure connections (e.g., encrypted tunnels) with the one or more user devices. In some aspects, the one or more user devices with which the user device 102 establishes the secure connections may also host respective client applications for communicating with the MSP control infrastructure 104 and/or with the user device 102. In some aspects, the processing unit 110 may be a logical unit including a logical component configured to perform complex operations associated with computing, for example, numerical weights related to various factors associated with providing the meshnet services.

One or more components (e.g., API 106, user database 108, processing unit 110, and/or meshnet database 112, processing unit 116) included in the MSP control infrastructure 104 and/or included in the user device 102 may further be associated with a controller/processor, a memory, a communication interface, or a combination thereof (e.g., FIG. 7). For instance, the one or more components of the set of components may include or may be included in a controller/processor, a memory, or a combination thereof. In some aspects, the one or more of the components included in the MSP control infrastructure 104 and/or the user device 102 may be separate and distinct from each other. Alternatively, in some aspects, one or more of the components included in the MSP control infrastructure 104 and/or the user device 102 may be combined with one or more of other components included in the MSP control infrastructure 104. In some aspects, the one or more of the components included in the MSP control infrastructure 104 and/or the user device 102 may be local with respect to each other. Alternatively, in some aspects, one or more of the components included in the MSP control infrastructure 104 and/or the user device 102 may be located remotely with respect to one or more of other components included in the MSP control infrastructure 104 and/or the user device 102. Additionally, or alternatively, one or more components of the components included in the MSP control infrastructure 104 and/or the user device 102 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

Endpoints (e.g., user devices) may rely on a mesh network to communicate (e.g., transmit and/or receive) data among the endpoints. In example 200 shown in FIG. 2, the endpoints may include a first user device, a second user device, a third user device, and/or a fourth user device. The data may be communicated using wired communications and/or wireless communications over a network such as, for example, the Internet. The communicated data may include any information including digital information such as, for example, documents including data, voice data, image data, signal data, and/or video data. Further, the internal mesh network may be a secure mesh network that may enable the endpoints to communicate the data in encrypted form via meshnet connections (shown as double-ended arrows in FIG. 2).

The endpoints may utilize a user datagram protocol (UDP) to communicate the data over the meshnet connections. To utilize the UDP, each of the endpoints may be associated with a respective UDP Internet protocol (IP) address and a respective UDP port. For instance, the first user device may be associated with a first UDP IP address and a first UDP port for communicating the data, the second user device may be associated with a second UDP IP address and a second UDP port for communicating the data, the third user device may be associated with a third UDP IP address and a third UDP port for communicating the data, and the fourth user device may be associated with a fourth UDP IP address and a fourth UDP port for communicating the data. During setup of the mesh network, each of the endpoints may receive communication information including, for example, the UDP IP address and the UDP port associated with each of the other of the endpoints to be utilized for communication.

The endpoints may communicate with each other based at least in part on the communication information. In an example, with respect to communication between the first user device and the second user device, the first user device may utilize the first UDP port to transmit data in an IP packet to the second UDP port, the IP packet indicating the first UDP IP address as a source address, the first UDP port as a source port, the second UDP IP address as a destination address, and the second UDP port as a destination port. The second user device may utilize the second UDP port to receive the IP packet. Similarly, with respect to communication between the third user device and the fourth user device, the fourth user device may utilize the fourth UDP port to transmit data in an IP packet to the third UDP port, the IP packet indicating the fourth UDP IP address as the source address, the fourth UDP port as the source port, the third UDP IP address as the destination address, and the third UDP port as the destination port. The third user device may utilize the third UDP port to receive the IP packet.

During communication among the endpoints, the mesh network may fail. In an example, due to independent network address translation (NAT) procedures, a UDP port associated with one or more of the endpoints may change. For instance, a NAT device (e.g., router, etc.) associated with a given endpoint may reallocate a given UDP port associated with the given endpoint for a task other than communication in the mesh network. In some cases, such reallocation may be due to lack of communication in the mesh network by the given endpoint for a threshold amount of time, due to a need for the given UDP port to support the task other than communication in the mesh network, network administration actions, NAT/router device reboot, and/or ISP actions. Because other endpoints in the mesh network (and the given endpoint) are unaware of the reallocation of the given UDP port, communications from the other endpoints transmitted to the given UDP port as the destination port may fail. In this case, the other endpoints may retransmit the communications to the given endpoint to ensure receipt thereof by the given endpoint. Such transmission and retransmission of communications may inefficiently consume user device resources (e.g., processing resources, memory resources, power consumption resources, battery life, or the like) and the network resources (computational resources, network bandwidth, management resources, processing resources, memory resources, or the like) that can otherwise be used to perform suitable tasks associated with the mesh network.

In another example, a given endpoint associated with a given UDP IP address may utilize a first technology (e.g., Wi-Fi technology) to access the Internet. The other endpoints in the mesh network may utilize the given UDP IP address to communicate data with the given endpoint. While communicating the data in the mesh network, the given endpoint may change its location, which may result in the given endpoint utilizing a different technology (e.g., mobile technology (e.g., LTE, CDMA, GSM, etc.)) to access the Internet. As a result, the given UDP IP address may change to a new UDP IP address. Because the other endpoints in the mesh network may be unaware of the change in the second UDP IP address, communications from the other endpoints (utilizing the second UDP IP address as the destination address and not the new UDP IP address) may fail to reach the given endpoint. The other endpoints may retransmit communications to the given endpoint to ensure receipt thereof by the given endpoint. Such transmission and retransmission of communications may inefficiently consume user device resources (e.g., processing resources, memory resources, power consumption resources, battery life, or the like) and the network resources (computational resources, network bandwidth, management resources, processing resources, memory resources, or the like) that can otherwise be used to perform suitable tasks associated with the mesh network.

Various aspects of systems and techniques discussed in the present disclosure enable aperiodic updating of parameters in a mesh network. In some aspects, an MSP control infrastructure may provide the mesh network to enable the endpoints to securely communicate data. Further, the MSP control infrastructure may provide the endpoints with respective client applications to communicate with the MSP control infrastructure, to communicate with each other for setting up respective meshnet connections to be utilized for communicating the data in the mesh network, and to communicate with each other over the respective meshnet connections in the mesh network. The MSP control infrastructure and the respective client applications may enable aperiodic updating of communication parameters (e.g., UDP IP addresses, UDP ports, etc.) associated with the endpoints. In some aspects, the MSP control infrastructure and the respective client applications may periodically request information regarding the communication parameters, thereby enabling updating of the communication parameters. Further, during one or more intervals between transmissions of the periodic requests, the respective client applications may determine occurrence of a triggering event, and, as a result, the respective client applications may transmit aperiodic requests requesting the MSP control infrastructure for information regarding the communication parameter (e.g., to determine a current communication parameter). In this way, the endpoints may communicate the data utilizing updated parameters, thereby enabling communication among the endpoints to continue uninterrupted. Further, the MSP control infrastructure and the respective applications may mitigate instances of inefficient transmissions and retransmissions of communications among the endpoints. As a result, the MSP control infrastructure and the respective client applications may enable efficient utilization of user device resources (e.g., processing resources, memory resources, power consumption resources, battery life, or the like) and network resources (computational resources, network bandwidth, management resources, processing resources, memory resources, or the like) for performing suitable tasks associated with the secure mesh network.

In some aspects, a processor (e.g., processing unit 116, processor 720) associated with a user device may transmit, while in communication with a second device in a mesh network, periodic requests to an infrastructure device associated with the mesh network, the periodic requests requesting the infrastructure device to determine a current communication parameter associated with the first device; monitor, during an interval between transmissions of the periodic requests, occurrence of a triggering event; and transmit, based at least in part on determining occurrence of the triggering event during the interval, an aperiodic request the infrastructure device to determine the current communication parameter associated with the first device.

As indicated above, FIG. 2 is provided as an example. Other examples may differ from what is described with regard to FIG. 2.

FIG. 3 is an illustration of an example flow 300 associated with aperiodic updating of parameters in a mesh network, according to various aspects of the present disclosure. The example flow 300 may include a first user device (e.g., first endpoint), MSP control infrastructure 104, and a second user device (e.g., second endpoint) in communication with each other. The first user device and the second user device may be similar to a user device 102 discussed above with respect to FIG. 1. In some aspects, the first user device and the second user device may be associated with a single account registered with the MSP control infrastructure 104. In some aspects, the first user device and the second user device may be associated with different accounts registered with the MSP control infrastructure 104. In some aspects, the first user device and the second user device may be located locally (e.g., in the same room, in the same building, etc.). In some aspects, the first user device and the second user device may be located remotely (e.g., in different buildings, in different cities, in different states, in different countries, etc.) with respect to each other. The first user device may install a first client application (e.g., client application 114) and the second user device may install a second client application (e.g., client application 114), the first client application and the second client application being associated with (e.g., provided by) the MSP control infrastructure 104. The first user device and the second user device may use the respective client applications to communicate with an application programming interface (API) and/or a processor (e.g., processing unit 110, processor 720) associated with the MSP control infrastructure 104. In some aspects, the first user device, the MSP control infrastructure 104, and the second user device may communicate with each other over a network (e.g., network 118). In some aspects, as discussed elsewhere herein, the MSP control infrastructure 104 may enable the first user device and/or the second user device to obtain the mesh network services. Although only two user devices (e.g., endpoints) are discussed with respect to FIG. 3, the present disclosure contemplates the mesh network to include any number of user devices that perform the processes discussed herein in a similar and/or analogous manner. For instance, the mesh network may include a third user device and a fourth user device, as discussed above with respect to FIG. 2, that perform the processes discussed herein in a similar and/or analogous manner. Further, user devices may leave or join the mesh network in an ad-hoc manner.

In some aspects, the client applications may enable the user devices to receive information to be processed by the client applications and/or by the MSP control infrastructure 104. Each of the client applications may include respective graphical user interfaces to receive the information via local input interfaces (e.g., touch screen, keyboard, mouse, pointer, etc.) associated with the user devices. The information may be received via text input or via a selection from among a plurality of options (e.g., pull down menu, etc.). In some aspects, the first client application and/or the second client application may activate and/or enable, at a time associated with the registration (e.g., after the registration), the graphical interface for receiving the information. For instance, the first client application (or the second client application) may cause a screen (e.g., local screen) associated with the first user device (or the second user device) to display, for example, a pop-up message to request entry of the information. Further, the client applications may enable transmission of at least a portion of the information to the MSP control infrastructure 104. In some aspects, the first client application may utilize a first processing unit (e.g., processing unit 116, processor 720) included in the first user device to perform processes/operations associated with obtaining the mesh network services and the second application may utilize a second processing unit (e.g., processing unit 116, processor 720) included in the second user device to perform processes/operations associated with obtaining the mesh network services.

As shown by reference numeral 305, the first user device may register an account with the MSP control infrastructure 104. In some aspects, during the registration, the first user device may provide registration information such as, for example, identity of an owner of the first user device, a phone number associated with the first user device, an email address associated with the first user device, or the like. In some aspects, the first user device may set up an access system including login information (e.g., access information) such as, for example, username, password, or the like to subsequently gain access to the registered account. In some aspects, the first user device may share the login information with other user devices (e.g., second user device) associated with the first user device to enable the other user devices to utilize the login information to gain access to the MSP control infrastructure 104 via the registered account. In some aspects, a given user device may be associated with the first user device because the given user device may be available to a user/owner of the first user device. In some aspects, when the second user device is not associated with the registered account associated with the first user device, the second user device may register a different account with the MSP control infrastructure 104.

In some aspects, the first user device and the second user device may utilize the login information to access the registered account/accounts to communicate with the MSP control infrastructure 104. As shown by reference numeral 310, based at least in part on the first user device and the second user device accessing the registered account/accounts to communicate with the MSP control infrastructure 104, the MSP control infrastructure 104 may transmit, and the first client application and the second client application may receive, MSP access information. In some aspects, the MSP access information may include UDP access information. The UDP access information may include information regarding an infrastructure UDP IP address and an infrastructure UDP port associated with the MSP control infrastructure 104. The MSP control infrastructure 104 may utilize the infrastructure UDP IP address and the infrastructure UDP port to communicate utilizing the UDP. In some aspects, the first user device and the second user device may utilize the infrastructure UDP IP address and the infrastructure UDP port to communicate with the MSP control infrastructure 104 regarding the mesh network. Further, the first client application and the second client application may obtain. from, for example, a domain name services (DNS) server, transmission control protocol (TCP) access information associated with the MSP control infrastructure 104. Such TCP access information may include information regarding an infrastructure TCP IP address and an infrastructure TCP port associated with the MSP control infrastructure 104. The MSP control infrastructure 104 may utilize the infrastructure TCP IP address and the infrastructure TCP port to communicate utilizing the TCP.

As shown by reference numeral 315, the first client application and the second client application may determine information based at least in part on the registration of the account/accounts with the MSP control infrastructure 104. In an example, the first client application may determine a first asymmetric assigned key pair associated with the first user device. The first assigned key pair may be unique to the first user device and may include a first assigned public key and a first assigned private key. In this way, the first assigned public key and the first assigned private key may be device-specific and maybe associated with the registered account. In some aspects, the first assigned public key and the first assigned private key may be associated with each other via, for example, a mathematical function. As a result, data encrypted using the first assigned public key may be decrypted by utilizing the first assigned private key.

Similarly, the second client application may determine a second asymmetric assigned key pair associated with the second user device. The second assigned key pair may be unique to the second user device and may include a second assigned public key and a second assigned private key. In this way, the second assigned public key and the second assigned private key may be device-specific and may be associated with the registered account. In some aspects, the second assigned public key and the second assigned private key may be associated with each other via, for example, a mathematical function. As a result, data encrypted using the second assigned public key may be decrypted by utilizing the second assigned private key.

As shown by reference numeral 320, the client applications may transmit, and the MSP control infrastructure 104 may receive, at least a portion of the information determined by the client applications. For instance, the first client application may transmit, for example, the first assigned public key to the MSP control infrastructure 104, and the second client application may transmit, for example, the second assigned public key to the MSP control infrastructure 104. The MSP control infrastructure 104 may store and correlate the received information in association with the registered account and/or with the respective user devices. In an example, the MSP control infrastructure 104 may store and correlate the first assigned public key in association with the registered account and the first user device, and may store and correlate the second assigned public key in association with the registered account and the second user device. In some aspects, the first client application and the second client application may utilize the infrastructure TCP IP address and the infrastructure TCP port to transmit the first assigned public key and the second assigned public key to the MSP control infrastructure 104 via the TCP.

Further, as shown by reference numeral 325, the MSP control infrastructure 104 may determine that the first user device and the second user device are to be included in the same mesh network. In some aspects, when the first user device and the second user device are associated with the same registered account, the MSP control infrastructure 104 may make such a determination regarding the secure mesh network based at least in part on determining that the first user device and the second user device are communicating with the MSP control infrastructure 104 by utilizing the login information associated with the same registered account. In some aspects, when the first user device and the second user device are associated with different registered accounts, the MSP control infrastructure 104 may make such a determination regarding the secure mesh network based at least in part on the first user device (or the second user device) providing information indicating that the first user device and the second user device are to be included in the secure mesh network. Such information may include, for example, identification information (e.g., type of device, etc.) associated with the second user device (or the first user device), the second IP address (or the first IP address), or the like.

Based at least in part on determining that the first user device and the second user device are to be included in the same mesh network, as shown by reference numeral 330, the MSP control infrastructure 104 may determine meshnet IP addresses for the first user device and for the second user device. In an example, the MSP control infrastructure 104 may determine a first meshnet IP address associated with the first user device and a second meshnet IP address associated with the second user device. The first client application and/or another application installed on the first user device and/or the operating system associated with the first user device may utilize the first meshnet IP address and/or the first local meshnet port to communicate data with the endpoints over meshnet connections in the mesh network and the second user device may utilize the second meshnet IP address and/or the second local meshnet port to communicate data with the endpoints over the meshnet connections in the mesh network. In an example, with respect to communication between the first user device and the second user device, the first user device may determine a first meshnet IP packet indicating the first meshnet IP address as a source address, the first local meshnet port as a source port, the second meshnet IP address as a destination address, and the second local meshnet port as a destination port. The first user device may encrypt and encapsulate the first meshnet IP packet within a payload of a transmitted UDP IP packet. The second user device may receive the UDP IP packet, may decrypt the first meshnet IP packet, and may route the first meshnet IP packet to the second local meshnet port. Similarly, the second user device may determine a second meshnet IP packet indicating the second meshnet IP address as a source address, the second local meshnet port as a source port, the first meshnet IP address as a destination address, and the first local meshnet port as a destination port. The second user device may encrypt and encapsulate the second meshnet IP packet within a payload of a transmitted UDP IP packet. The first user device may receive the UDP IP packet, may decrypt the first meshnet IP packet, and may route the second meshnet IP packet to the first local meshnet port. The MSP control infrastructure 104 may determine the first meshnet IP address and the second meshnet IP address from, for example, a pool of reserved IP addresses included in a subnet associated with an internal network of the ISP.

In some aspects, example processes associated with blocks 305 through 330 may take place asynchronously. In some aspects, example processes associated with blocks 335 and 355 may take place substantially synchronously.

As shown by reference numeral 335, the first user device and the second user device may transmit, and the MSP control infrastructure 104 may receive, respective binding requests. In an example, the first user device may transmit a first binding request to the MSP control infrastructure 104 to request the MSP control infrastructure 104 to determine a first UDP IP address (e.g., communication address) and a first UDP port (e.g., communication port) associated with the first device. In some aspects, the first user device may transmit the first binding request to the MSP control infrastructure 104 using the UDP by utilizing the UDP access information received from the MSP control infrastructure 104 (e.g., block 310). As discussed below in further detail, the first UDP IP address and the first UDP port are to be utilized by the second user device to communicate with the first user device in the mesh network. Similarly, the second user device may transmit a second binding request to the MSP control infrastructure 104 to request the MSP control infrastructure 104 to determine a second UDP IP address (e.g., communication address) and a second UDP port (e.g., communication port) associated with the second device. In some aspects, the second user device may transmit the second binding request to the MSP control infrastructure 104 using the UDP by utilizing the UDP access information received from the MSP control infrastructure 104 (e.g., block 310). As discussed below in further detail, the second UDP IP address and the second UDP port are to be utilized by the first user device to communicate with the second user device in the mesh network.

In some aspects, the first UDP IP address and the first UDP port may be determined by a first NAT device responsible for managing operation of the first user device in a first local network. In an example, the first NAT device may translate a first local UDP IP address and a first local UDP port associated with the first user device to the first UDP IP address and the first UDP port that the first user device utilizes to communicate (e.g., transmit and/or receive) over the Internet using the UDP. Similarly, the second UDP IP address and the second UDP port may be determined by a second NAT device responsible for managing operation of the second user device in a second local network. In an example, the second NAT device may translate a second local UDP IP address and a second local UDP port associated with the second user device to the second UDP IP address and the second UDP port that the second user device utilized to communicate (e.g., transmit and/or receive) over the Internet using the UDP.

Based at least in part on receiving the respective binding requests, as shown by reference numeral 340, the MSP control infrastructure 104 may determine UDP IP addresses and UDP ports for the first user device and the second user device. In an example, based at least in part on receiving the first binding request, the MSP control infrastructure 104 may determine the first UDP IP address and the first UDP port associated with the first user device. In some aspects, the MSP control infrastructure 104 may determine the first UDP IP address and the first UDP port based at least in part on analyzing the UDP communication (e.g., UDP IP packet) including the first binding request received from the first user device. The UDP communication may include, for example, a header that indicates the first UDP IP address as a source UDP IP address and the first UDP port as a source UDP port associated with the first user device. Further, the MSP control infrastructure 104 may store and correlate the first UDP IP address and the first UDP port in association with the first user device in, for example, the meshnet database 112. Similarly, based at least in part on receiving the second binding request, the MSP control infrastructure 104 may determine the second UDP IP address and the second UDP port associated with the second user device. In some aspects, the MSP control infrastructure 104 may determine the second UDP IP address and the second UDP port based at least in part on analyzing the UDP communication (e.g., UDP IP packet) including the second binding request received from the second user device. The UDP communication may include, for example, a header that indicates the second UDP IP address as a source UDP IP address and the second UDP port as a source UDP port associated with the second user device. Further, the MSP control infrastructure 104 may store and correlate the second UDP IP address and the second UDP port in association with the second user device in, for example, the meshnet database 112.

Based at least in part on determining the UDP IP addresses and the UDP ports, as shown by reference numeral 345, the MSP control infrastructure 104 may transmit, and the first client application and the second client application may receive, communication information. In an example, the MSP control infrastructure 104 may transmit, and the first client application may receive, first communication information including the first meshnet IP address associated with the first user device, the second meshnet IP address associated with the second user device, the second UDP IP address and the second UDP port associated with the second user device, and the second public key associated with the second user device. Similarly, the MSP control infrastructure 104 may transmit, and the second client application may receive, second communication information including the first UDP IP address and the first UDP port associated with the first user device, the first public key associated with the first user device, the first meshnet IP address associated with the first user device, and the second meshnet IP address associated with the second user device. As discussed below in further detail, the above transmission of communication information may enable the first user device and the second user device to communicate securely and privately in the mesh network.

As shown by reference numeral 350, the first user device and the second user device may communicate with each other to set up a meshnet connection (e.g., an encrypted tunnel) for communicating encrypted data in the mesh network. To set up the meshnet connection, the first client application may utilize the second assigned public key and/or the second public IP address to securely (e.g., in encrypted form) communicate with the second user device, and the second client application may utilize the first assigned public key and/or the first public IP address to securely communicate with the first user device. In some aspects, the first user device and the second user device may communicate to securely/privately negotiate parameters (e.g., a symmetric encryption/decryption key) associated with the meshnet connection. In some aspects, the parameters may be randomly generated to provide optimized security to the communications. In an example, the first user device and the second user device may privately negotiate a randomly generated symmetric key that is to be utilized by the first user device and the second user device for encrypting and decrypting data communicated via the meshnet connection. The randomly generated symmetric key may be determined based at least in part on any combination of the first public key, the second public key, and/or randomly generated numbers. Additionally, the first user device and the second user device may utilize a secure protocol (e.g., Wireguard, IP sec, etc.) to communicate the data via the meshnet connection. Based at least in part on setting up the meshnet connection, the first user device and the second user device may start communicating encrypted data via the meshnet connection based at least in part on utilizing the negotiated parameters and the secure protocol.

Further, based at least in part on setting up the meshnet connection, as shown by reference numeral 355, the first user device, the second user device, and the MSP control infrastructure 104 may enable aperiodic updating of communication parameters (e.g., the UDP IP addresses and/or the UDP ports associated with the first user device and with the second user device) in the mesh network.

In some aspects, while communicating data with the second user device via the meshnet connection in the mesh network, the first client application may transmit, and the MSP control infrastructure 104 may receive, a first current binding request to request the MSP control infrastructure 104 to determine a current first UDP IP address (e.g., updated communication address) and/or a current first UDP port (e.g., updated communication port) associated with the first device. In a similar and/or analogous manner as the first binding request discussed above with respect to block 335, the first client application may transmit the first current binding request using the UDP by utilizing the UDP access information received from the MSP control infrastructure 104 (e.g., block 310).

Based at least in part on receiving the first current binding request, the MSP control infrastructure 104 may determine the current first UDP IP address and/or the current first UDP port associated with the first user device. In some aspects, the MSP control infrastructure 104 may determine the current first UDP IP address and/or the current first UDP port based at least in part on analyzing the UDP communication (e.g., UDP IP packet) including the first current binding request received from the first user device. The UDP communication may include, for example, a header that indicates the current first UDP IP address as a source UDP IP address and/or the current first UDP port as a source UDP port associated with the first user device. Further, the MSP control infrastructure 104 may update the stored correlation of the first UDP IP address and/or the first UDP port in association with the first user device in, for example, the meshnet database 112. In an example, the MSP control infrastructure may replace the stored first UDP IP address and/or the first UDP port with the current first UDP IP address and/or the current first UDP port (e.g., updating the first correlation by replacing the first communication information with first updated communication information). Further, based at least in part on determining the current first UDP IP address and/or the current first UDP port, the MSP control infrastructure 104 may transmit, and the first client application and/or the second client application may receive, first communication information and/or second communication information, respectively, including the current first UDP IP address and/or the current first UDP port associated with the first user device. In some aspects, the MSP control infrastructure 104 may update the stored correlation and/or transmit the communication information when the MSP control infrastructure determines a change in the current first UDP IP address and/or the current first UDP port associated with the first user device.

Based at least in part on the first client application and/or the second client application receiving the current first UDP IP address and/or the current first UDP port, the first client application and the second client application may continue to securely communicate with each other via the meshnet connection in the mesh network without interruption.

In some aspects, the first client application may periodically transmit the first current binding request to the MSP control infrastructure 104. Instances associated with periodically transmitting the first current binding request may be, for example, every 15 seconds, every 25 seconds, every 35 seconds, every 45 seconds, every 60 seconds, every 120 seconds, etc.

Further, in some aspects, the first client application may refrain from transmitting, at a given instance, the first current binding request based at least in part on determining that a condition associated with transmitting the first current binding request is satisfied. In an example, the condition may be satisfied when the first client application determines that the first client application is actively communicating data with the second client application (or another respective client application associated with another user device in the mesh network) during the given instance (e.g., at a time associated with occurrence of the given instance). In another example, the condition may be satisfied when the first client application determines that the first client application and/or another application installed on the first user device (e.g., web browser, etc.) does not anticipate communicating data with the second client application (or another respective client application associated with another user device in the mesh network) for a given interval of time, and that the given instance is to occur within the given interval of time.

In some aspects, during intervals between the above instances associated with periodically transmitting the first current binding request, the first user device may enable aperiodic updating of the communication parameters (e.g., the first UDP IP address and/or the first UDP port) associated with the first user device in the mesh network. To aperiodically update the communication parameter, the first user device may monitor occurrence of one or more triggering events during the intervals between the instances associated with periodically transmitting the first current binding request. Occurrence of a triggering event may indicate a change in the communication parameter associated with the first user device. In some aspects, occurrence of a triggering event may result in the first NAT device retranslating the first local UDP IP address and/or the first local UDP port to the first UDP IP address and/or the first UDP port, respectively, which may result in a change in the first UDP IP address and/or the first UDP port. Based at least in part on determining an occurrence of a triggering event, the first user device may substantially instantaneously transmit an aperiodic current binding request to the MSP control infrastructure 104. The MSP control infrastructure 104 may determine the current UDP IP address and/or the current UDP port associated with the first user device based at least in part on information included in the aperiodic current binding request, as discussed elsewhere herein. Further, the MSP control infrastructure may utilize the determined current UDP IP address and/or the current UDP port to transmit communication information to indicate the determined current UDP IP address and/or the current UDP port, as discussed elsewhere herein (e.g., blocks 335-345). As a result, the first user device (and other user devices in the mesh network) may receive communication information indicating the current UDP IP address and/or the current UDP port associated with the first user device.

In an example, when an instance associated with transmitting the first current binding request is every 60 seconds, the first user device may monitor occurrence of one or more triggering events during a 60-second interval between the instances associated with periodically transmitting the first current binding request. Based at least in part on determining an occurrence of a triggering event at, for example, the 20-second mark during the 60-second interval, the first user device may determine occurrence of a potential change in the communication parameter associated with the first user device. As a result, the first user device may substantially instantaneously transmit an aperiodic current binding request to the MSP control infrastructure 104 at substantially the 20-second mark. Based at least in part on transmitting the aperiodic current binding request, the first user device (and other user devices in the mesh network) may receive, at substantially about the 20-second mark, communication information indicating the current UDP IP address and/or the current UDP port associated with the first user device. In this way, the other user devices in the mesh network may immediately start utilizing (at substantially about the 20-second mark) the current UDP IP address and/or the current UDP port associated with the first user device to communicate with the first user device without having to wait for an end of the 60-second interval. Further, instances of inefficient transmissions and retransmissions of communications among the user devices during the remainder of the interval (e.g., remaining 40 seconds) may be avoided.

The one or more triggering events, occurrence of which may indicate a potential change in the communication parameter associated with the first user device, may include, for example, a change in a local parameter associated with a LAN utilized by the first user device, a change in a routing table associated with the first user device, receipt of an indication indicating that a received packet was dropped by the first client application and/or by the first NAT device, receipt of an indication from another user device that a packet transmitted by the other user device to the first user device was dropped, etc.

In some aspects, during an interval between the instances associated with periodically transmitting the first current binding request, the first user device may monitor a change in a local IP address and/or a local port associated with a LAN utilized the first user device. In an example, while accessing the Internet utilizing Wi-Fi technology, the first user device may change its location, which may result in the first user device utilizing a different technology (e.g., mobile technology (e.g., LTE, CDMA, GSM, etc.)) to access the Internet. Such change in utilization of a different technology to access the Internet may result in a change in the local IP address and/or the local port associated with the LAN. As a consequence, new local IP address and/or the local port may be translated to the first UDP IP address and/or the first UDP port, respectively, which may result in a change in the first UDP IP address and/or the first UDP port. In another example, while communicating the meshnet data, the first user device may experience an expiration of a lease time associated with the local IP address and/or the local port. As a result, the first user device may utilize a different local IP address and/or a different local port. As discussed above, as a consequence, a change in the first UDP IP address and/or the first UDP port may result.

During the interval between the instances associated with periodically transmitting the first current binding request, the first client application may receive a message from an operating system associated with the first user device indicating a change in the local IP address and/or the local port associated with the LAN. Based at least in part on determining occurrence of a change in the local IP address and/or the local port, the first user device may determine a potential change in the first UDP IP address and/or the first UDP port. As a result, the first client application may substantially instantaneously transmit the aperiodic current binding request to the MSP control infrastructure 104. The MSP control infrastructure 104 may determine the current UDP IP address and/or the current UDP port associated with the first user device and may transmit communication information to indicate the determined current UDP IP address and/or the current UDP port, as discussed elsewhere herein (e.g., blocks 335-345). As a result, the first user device (and other user devices in the mesh network) may receive communication information indicating the current UDP IP address and/or the current UDP port associated with the first user device.

In some aspects, during an interval between the instances associated with periodically transmitting the first current binding request, the first user device may monitor a change in a routing table associated with the first user device. The routing table may list active routes that may be utilized by the first user device to transmit data to given destination addresses belonging to destination devices. The first user device may maintain (e.g., store and update) the routing table including an association of a destination IP address associated with a destination device with, for example, an interface to be utilized to transmit data to the destination device; a metric associated with the destination device; etc.

During the interval between the instances associated with periodically transmitting the first current binding request, the first client application may receive a message from an operating system associated with the first user device indicating a change in the routing table. The change in the routing table may include a change in one or more of the destination IP address, the interface, the metric, etc. In some aspects, the first client application may receive the message based at least in part on configuring the operating system to transmit the message when a change in the routing table occurs. In some aspects, the change in the routing table may indicate a potential change in the first UDP IP address and/or the first UDP port.

Based at least in part on determining occurrence of a change in the routing table, the first user device may substantially instantaneously transmit the aperiodic current binding request to the MSP control infrastructure 104. The MSP control infrastructure 104 may determine the current UDP IP address and/or the current UDP port associated with the first user device and may transmit communication information to indicate the determined current UDP IP address and/or the current UDP port, as discussed elsewhere herein (e.g., blocks 335-345). As a result, the first user device (and other user devices in the mesh network) may receive communication information indicating the current UDP IP address and/or the current UDP port associated with the first user device.

In some aspects, during an interval between the instances associated with periodically transmitting the first current binding request, the first user device may monitor receipt of an indication indicating that a received packet was dropped by the first client application and/or by the first NAT device. During the interval between the instances associated with periodically transmitting the first current binding request, the first client application may receive an indication (e.g., determine) that the first client application has dropped the received packet. Additionally, or alternatively, the first client application may receive an indication that the first NAT device has dropped the received packet. In some aspects, the first client application and/or the first NAT device may drop a packet received from another user device in the mesh network because the packet may include a different UDP IP address as the destination IP address in place of the current first UDP IP address. Additionally, or alternatively, the first client application and/or the first NAT device may drop the packet received from the other user device in the mesh network because the packet may include a different UDP port as the destination port in place of the current first UDP port.

Based at least in part on determining occurrence of receiving the indication indicating that the received packet was dropped by the first client application and/or by the first NAT device, the first user device may substantially instantaneously transmit the aperiodic current binding request to the MSP control infrastructure 104. The MSP control infrastructure 104 may determine the current UDP IP address and/or the current UDP port associated with the first user device and may transmit communication information to indicate the determined current UDP IP address and/or the current UDP port, as discussed elsewhere herein (e.g., blocks 335-345). As a result, the first user device (and other user devices in the mesh network) may receive communication information indicating the current UDP IP address and/or the current UDP port associated with the first user device.

In some aspects, during an interval between the instances associated with periodically transmitting the first current binding request, the first user device may monitor receipt of an indication from another user device indicating that a packet transmitted by the other user device to the first user device was dropped. During the interval between the instances associated with periodically transmitting the first current binding request, the first client application may receive an indication from the other user device indicating that the packet transmitted by the other user device to the first user device was dropped. In some aspects, the other user device may determine that the packet transmitted by the other user device to the first user device was dropped based at least in part on the first user device or the first NAT device transmitting a drop message to the other user device, the drop message indicating that the packet transmitted by the other user device to the first user device was dropped. In some aspects, the drop message may be communicated utilizing an internet control message protocol (ICMP). Based at least in part on receiving the drop message, the other user device may transmit a request message to the first user device, the request message requesting the first user device to transmit the aperiodic current binding request to MSP control infrastructure 104. In some aspects, the request message may be transmitted by the other user device to the first user device via the relay server, as discussed elsewhere herein.

In some aspects, the first NAT device may drop a packet received from the other user device in the mesh network because the packet may include a different UDP IP address as the destination IP address in place of the current first UDP IP address. Additionally, or alternatively, the first client application and/or the first NAT device may drop the packet received from the other user device in the mesh network because the packet may include a different UDP port as the destination port in place of the current first UDP port.

Based at least in part on determining occurrence of receiving the request message, the first user device may substantially instantaneously transmit the aperiodic current binding request to the MSP control infrastructure 104. The MSP control infrastructure 104 may determine the current UDP IP address and/or the current UDP port associated with the first user device and may transmit communication information to indicate the determined current UDP IP address and/or the current UDP port, as discussed elsewhere herein (e.g., blocks 335-345). As a result, the first user device (and other user devices in the mesh network) may receive communication information indicating the current UDP IP address and/or the current UDP port associated with the first user device.

In some aspects, the other user devices (e.g., second user device, third user device, fourth user device, etc.) included in the mesh network may update respective meshnet IP address maps in a similar and/or analogous manner as discussed herein with respect to the first user device. For instance, the other user devices in the mesh network may, among other things, receive communication information and update respective meshnet IP address maps, as discussed herein. Additional user devices that enter the mesh network may also update respective meshnet IP address maps, as discussed herein.

In this way, by utilizing the systems and techniques discussed herein, the MSP control infrastructure 104 and the respective client applications may enable the user devices included in the mesh network to continue to communicate with each other without interruption and mitigate instances of inefficient transmissions and retransmissions of communications among the user devices when respective UDP IP addresses and/or UDP ports change in the mesh network. As a result, the MSP control infrastructure and the respective client applications may enable efficient utilization of user device resources (e.g., processing resources, memory resources, power consumption resources, battery life, or the like) and network resources (computational resources, network bandwidth, management resources, processing resources, memory resources, or the like) for performing suitable tasks associated with the secure mesh network.

As indicated above, FIG. 3 is provided as an example. Other examples may differ from what is described with regard to FIG. 3.

FIG. 4 is an illustration of an example process 400 associated with aperiodic updating of parameters in a mesh network, according to various aspects of the present disclosure. In some aspects, the process 400 may be performed by a memory and/or a processor/controller (e.g., processing unit 116, processor 720) associated with a user device (e.g., user device 102) running a client application. As shown by reference numeral 410, process 400 may include transmitting, by a first device in communication with a second device in a mesh network, periodic requests to an infrastructure device associated with the mesh network, the periodic requests requesting the infrastructure device to determine a communication parameter associated with the first device. For instance, the user device may utilize an associated communication interface (e.g., communication interface 770) along with the associated memory and/or processor to transmit, while in communication with a second device in a mesh network, periodic requests to an infrastructure device associated with the mesh network, the periodic requests requesting the infrastructure device to determine a communication parameter associated with the first device, as discussed elsewhere herein.

As shown by reference numeral 420, process 400 may include monitoring, by the first device during an interval between transmission of the periodic requests, occurrence of a triggering event. For instance, the user device may utilize the associated memory and/or processor to monitor, during an interval between transmission of the periodic requests, occurrence of a triggering event, as discussed elsewhere herein.

As shown by reference numeral 430, process 400 may include transmitting, by the first device based at least in part on determining occurrence of the triggering event during the interval, an aperiodic request the infrastructure device to determine the parameter associated with the first device. For instance, the user device may utilize the associated communication interface along with the memory and/or processor to transmit, based at least in part on determining occurrence of the triggering event during the interval, an aperiodic request the infrastructure device to determine the parameter associated with the first device, as discussed elsewhere herein.

Process 400 may include additional aspects, such as any single aspect or any combination of aspects described below and/or in connection with one or more other processes described elsewhere herein.

In a first aspect, in process 400, occurrence of the triggering event includes a change in a local internet protocol (IP) address and/or a local port associated with a local access network (LAN) utilized by the first device.

In a second aspect, alone or in combination with the first aspect, in process 400, occurrence of the triggering event includes a change in a routing table associated with the first user device.

In a third aspect, alone or in combination with the first through second aspects, in process 400, occurrence of the triggering event includes determining that a received packet was dropped by a first client application associated with the first device or by the first network address translation (NAT) device associated with the first device.

In a fourth aspect, alone or in combination with the first through third aspects, in process 400, occurrence of the triggering event includes receipt of an indication from the second device that a packet transmitted by the second device to the first device was dropped.

In a fifth aspect, alone or in combination with the first through fourth aspects, in process 400, the communication parameter includes a public internet protocol (IP) address or a public port utilized by the first device to communicate meshnet data with the second device.

In a sixth aspect, alone or in combination with the first through fifth aspects, in process 400, occurrence of the triggering event indicates a change in the parameter associated with the first device.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with aperiodic updating of parameters in a mesh network, according to various aspects of the present disclosure. In some aspects, the process 500 may be performed by a memory and/or a processor/controller (e.g., processing unit 116, processor 720) associated with a user device (e.g., user device 102) running a client application. As shown by reference numeral 510, process 500 may include transmitting, by a first device in communication with a second device in a mesh network, periodic requests to an infrastructure device associated with the mesh network, the periodic requests requesting the infrastructure device to determine a current communication parameter associated with the first device. For instance, the user device may utilize an associated communication interface (e.g., communication interface 770) along with the associated memory and/or processor to transmit, while in communication with a second device in a mesh network, periodic requests to an infrastructure device associated with the mesh network, the periodic requests requesting the infrastructure device to determine a current communication parameter associated with the first device, as discussed elsewhere herein.

As shown by reference numeral 520, process 500 may include transmitting, by the first device during an interval between transmissions of the periodic requests, an aperiodic request requesting the infrastructure device to determine the current communication parameter based at least in part on determining occurrence of a triggering event during the interval. For instance, the user device may utilize the associated communication interface, memory and/or processor to transmit, during an interval between transmissions of the periodic requests, an aperiodic request requesting the infrastructure device to determine the current communication parameter based at least in part on determining occurrence of a triggering event during the interval, as discussed elsewhere herein.

As shown by reference numeral 530, process 500 may include receiving, by the first device during the interval, communication information based at least in part on transmitting the aperiodic request, the communication information indicating the current communication parameter. For instance, the user device may utilize the associated communication interface, memory, and/or processor to receive, during the interval, communication information based at least in part on transmitting the aperiodic request, the communication information indicating the current communication parameter, as discussed elsewhere herein.

As shown by reference numeral 540, process 500 may include communicating, by the first device with the second device, meshnet data in the mesh network based at least in part on utilizing the communication information indicating the current communication parameter. For instance, the user device may utilize the associated communication interface, memory, and/or processor to communicate (e.g., transmit and/or receive), with the second device, meshnet data in the mesh network based at least in part on utilizing the communication information indicating the current communication parameter, as discussed elsewhere herein.

Process 500 may include additional aspects, such as any single aspect or any combination of aspects described below and/or in connection with one or more other processes described elsewhere herein.

In a first aspect, in process 500, transmitting the aperiodic request includes transmitting the aperiodic request prior to an expiration of the interval between transmissions of the periodic requests.

In a second aspect, alone or in combination with the first aspect, process 500 may include determining occurrence of a potential change in the current communication parameter based at least in part on determining occurrence of the triggering event.

In a third aspect, alone or in combination with the first through second aspects, in process 500, determining occurrence of the triggering event includes receiving, via a relay server, an indication that a packet transmitted by the second device to the first device was dropped.

In a fourth aspect, alone or in combination with the first through third aspects, in process 500, determining occurrence of the triggering event includes determining that a received packet was dropped by a first client application associated with the first device based at least in part on the packet indicating a destination parameter other than the current communication parameter.

In a fifth aspect, alone or in combination with the first through fourth aspects, in process 500, determining occurrence of the triggering event includes determining that a received packet was dropped by a network address translation (NAT) device associated with the first device based at least in part on the packet indicating a destination parameter other than the current communication parameter.

In a sixth aspect, alone or in combination with the first through fifth aspects, in process 500, the current communication parameter includes a public internet protocol (IP) address or a public port utilized by the first device to communicate the meshnet data with the second device.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with aperiodic updating of parameters in a mesh network, according to various aspects of the present disclosure. In some aspects, the process 600 may be performed by a memory and/or a processor/controller (e.g., processing unit 110, processor 720) associated with an infrastructure device (e.g., MSP control infrastructure 104). As shown by reference numeral 610, process 600 may include receiving, by an infrastructure device from a first device in communication with a second device in a mesh network, periodic requests requesting the infrastructure device to determine a current communication parameter associated with the first device. For instance, the infrastructure device may utilize an associated communication interface (e.g., communication interface 770) along with the memory and/or processor to receive, from a first device in communication with a second device in a mesh network, periodic requests requesting the infrastructure device to determine a current communication parameter associated with the first device, as discussed elsewhere herein.

As shown by reference numeral 620, process 600 may include receiving, by the infrastructure device from first device during an interval between transmissions of the periodic requests, an aperiodic request requesting the infrastructure device to determine the current communication parameter based at least in part on the first device determining occurrence of a triggering event during the interval. For instance, the user device may utilize the associated communication interface, memory, and/or processor to receive, from first device during an interval between transmissions of the periodic requests, an aperiodic request requesting the infrastructure device to determine the current communication parameter based at least in part on the first device determining occurrence of a triggering event during the interval, as discussed elsewhere herein.

As shown by reference numeral 630, process 600 may include transmitting, by the infrastructure device to the first device during the interval, communication information based at least in part on receiving the aperiodic request, the communication information indicating the current communication parameter. For instance, the user device may utilize the associated communication interface, memory, and/or processor to transmit, to the first device during the interval, communication information based at least in part on receiving the aperiodic request, the communication information indicating the current communication parameter, as discussed elsewhere herein.

Process 600 may include additional aspects, such as any single aspect or any combination of aspects described below and/or in connection with one or more other processes described elsewhere herein.

In a first aspect, in process 600, receiving the aperiodic request includes receiving the aperiodic request prior to an expiration of the interval between transmissions of the periodic requests.

In a second aspect, alone or in combination with the first aspect, in process 600, transmitting the communication information includes transmitting the communication information based at least in part on utilizing the current communication parameter.

In a third aspect, alone or in combination with the first through second aspects, process 600 may include transmitting, by the infrastructure device to the second device during the interval, the communication information indicating the current communication parameter associated with the first device.

In a fourth aspect, alone or in combination with the first through third aspects, process 600 may include determining the current communication parameter based at least in part on information included in the aperiodic request.

In a fifth aspect, alone or in combination with the first through fourth aspects, in process 600, the current communication parameter includes a public internet protocol (IP) address or a public port utilized by the first device to communicate the meshnet data with the second device.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700 associated with aperiodic updating of parameters in a mesh network, according to various aspects of the present disclosure. In some aspects, the example devices 700 may form part of or implement the systems, servers, environments, infrastructures, components, devices, or the like described elsewhere herein (e.g., MSP control infrastructure, user device, etc.) and may be used to perform example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by an infrastructure device from a first device in communication with a second device in a mesh network, periodic requests requesting the infrastructure device to determine a communication parameter associated with the first device;
   receiving, by the infrastructure device from first device during an interval between transmissions of the periodic requests, an aperiodic request requesting the infrastructure device to determine the communication parameter based at least in part on the first device determining occurrence of a triggering event during the interval, the determining including determining that a received packet was dropped, by the first device or by a network address translation (NAT) device associated with the first device, based at least in part on the received packet indicating a destination parameter other than the communication parameter; and
   transmitting, by the infrastructure device to the first device during the interval, communication information based at least in part on receiving the aperiodic request, the communication information indicating the communication parameter.

2. The method of claim 1, wherein receiving the aperiodic request includes receiving the aperiodic request prior to an expiration of the interval between transmissions of the periodic requests.

3. The method of claim 1, wherein transmitting the communication information includes transmitting the communication information based at least in part on utilizing the communication parameter.

4. The method of claim 1, further comprising:
   transmitting, by the infrastructure device to the second device during the interval, the communication information indicating the communication parameter associated with the first device.

5. The method of claim 1, further comprising:
   determining the communication parameter based at least in part on information included in the aperiodic request.

6. The method of claim 1, wherein the communication parameter includes a public internet protocol (IP) address or a public port utilized by the first device to communicate the meshnet data with the second device.

7. An infrastructure device, comprising:
   a memory; and
   a processor communicatively coupled to the memory, the memory and the processor being configured to:
   receive, from a first device in communication with a second device in a mesh network, periodic requests requesting the infrastructure device to determine a communication parameter associated with the first device;
   receive, from first device during an interval between transmissions of the periodic requests, an aperiodic request requesting the infrastructure device to determine the communication parameter based at least in part on the first device determining occurrence of a triggering event during the interval, the determining including determining that a received packet was dropped, by the first device or by a network address translation (NAT) device associated with the first device, based at least in part on the received packet indicating a destination parameter other than the communication parameter; and transmit, to the first device during the interval, communication information based at least in part on receiving the aperiodic request, the communication information indicating the communication parameter.

8. The infrastructure device of claim 7, wherein, to receive the aperiodic request, the memory and the processor are configured to receive the aperiodic request prior to an expiration of the interval between transmissions of the periodic requests.

9. The infrastructure device of claim 7, wherein, to transmit the communication information, the memory and the processor are configured to transmit the communication information based at least in part on utilizing the communication parameter.

10. The infrastructure device of claim 7, wherein the memory and the processor are configured to:
transmit, to the second device during the interval, the communication information indicating the communication parameter associated with the first device.

11. The infrastructure device of claim 7, wherein the memory and the processor are configured to:
determine the communication parameter based at least in part on information included in the aperiodic request.

12. The infrastructure device of claim 7, wherein the communication parameter includes a public internet protocol (IP) address or a public port utilized by the first device to communicate the meshnet data with the second device.

13. A non-transitory computer-readable medium configured to store instructions, which when executed by a processor associated with an infrastructure device, configure the processor to:
receive, from a first device in communication with a second device in a mesh network, periodic requests requesting the infrastructure device to determine a communication parameter associated with the first device;
receive, from first device during an interval between transmissions of the periodic requests, an aperiodic request requesting the infrastructure device to determine the communication parameter based at least in part on the first device determining occurrence of a triggering event during the interval, the determining including determining that a received packet was dropped, by the first device or by a network address translation (NAT) device associated with the first device, based at least in part on the received packet indicating a destination parameter other than the communication parameter; and transmit, to the first device during the interval, communication information based at least in part on receiving the aperiodic request, the communication information indicating the communication parameter.

14. The non-transitory computer-readable medium of claim 13, wherein, to receive the aperiodic request, the processor is configured to receive the aperiodic request prior to an expiration of the interval between transmissions of the periodic requests.

15. The non-transitory computer-readable medium of claim 13, wherein, to transmit the communication information, the processor is configured to transmit the communication information based at least in part on utilizing the communication parameter.

16. The non-transitory computer-readable medium of claim 13, wherein the processor is configured to:
transmit, to the second device during the interval, the communication information indicating the communication parameter associated with the first device.

17. The non-transitory computer-readable medium of claim 13, wherein the processor is configured to:
determine the communication parameter based at least in part on information included in the aperiodic request.

18. The non-transitory computer-readable medium of claim 13, wherein the communication parameter includes a public internet protocol (IP) address or a public port utilized by the first device to communicate the meshnet data with the second device.

19. The method of claim 1, wherein determining occurrence of the triggering event includes determining a change in a technology utilized by the first device to access a web network.

20. The infrastructure device of claim 7, wherein determining occurrence of the triggering event includes determining a change in a technology utilized by the first device to access a web network.

* * * * *